O. E. Murray,
Hay Fork.

No. 80,002. Patented July 14, 1868.

Witnesses  Inventor:
H. C. Ashketter  C. E. Murray
J. A. Fraser  per Munn & Co
 Attorneys

United States Patent Office.

C. E. MURRAY, OF SUGAR VALLEY, PENNSYLVANIA.

Letters Patent No. 80,002, dated July 14, 1868.

---

IMPROVEMENT IN HORSE HAY-FORKS.

---

The Schedule referred to in these Letters Patent and making part of the same.

---

TO ALL WHOM IT MAY CONCERN:

Be it known, that I, C. E. MURRAY, of Sugar Valley, in the county of Clinton, and State of Pennsylvania, have invented a new and improved Horse Hay-Fork; and I do hereby declare that the following is a full, clear, and exact description thereof, which will enable others skilled in the art to make and use the same, reference being had to the accompanying drawings, forming part of this specification.

This invention relates to a new and improved horse hay-fork for unloading hay, and mowing it away in barns, or forming stacks.

The invention consists in a peculiar construction of the fork, as hereinafter fully shown and described, whereby a large amount of hay may be lifted or unloaded in a given time.

In the accompanying sheet of drawings—

Figure 1:
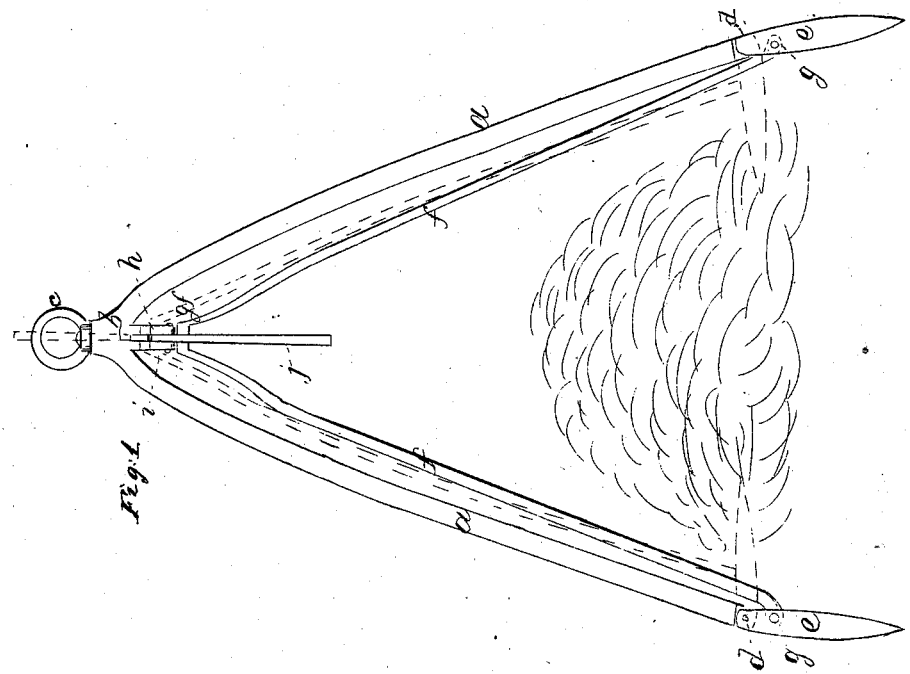

Figure 1 is a side view of my invention.

Figure 2:
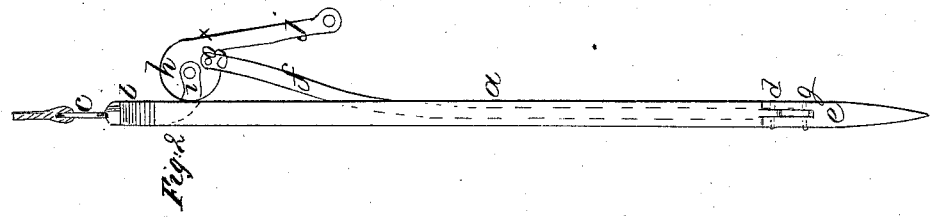

Figure 2, an edge view of the same.

Similar letters of reference indicate corresponding parts.

The frame consists of two prongs, $a\,a$, which diverge from each other, from their junction or head $b$, to which a swivel-ring, $c$, is attached. The hoisting rope (shown in red) is connected to this swivel-ring.

To the lower end of each prong $a$ there is attached, by a joint, $d$, a tooth, $e$.

These teeth may be turned down in line with the prongs $a\,a$, or turned upward and inward at right angles with the same, as shown in red in fig. 1. These teeth $e\,e$ have rods $f\,f$ attached to them by pivots $g$, and the upper ends of the rods are connected, as shown at $g^\times$, to opposite sides of an eccentric, $h$, which is fitted in an arm, $i$, the latter being attached to and projecting from the head $b$ of the frame.

The eccentric, $h$, has an arm, $j$, projecting from it, to which a trip-rope is attached, and when this arm $j$ is drawn down, as shown in fig. 2, the teeth $e\,e$ may be shoved into the hay on the loaded wagon or cart, and when forced into the hay the arm $j$ is shoved upward, and the teeth $e\,e$ thereby raised to a position at about right angles with the prongs, as shown in red in fig. 1. The implement is then raised by means of a horse connected with the usual tackle, and the load is held in the fork by the teeth $e\,e$, and, when the load is over the desired spot, the operator, by pulling the trip-rope, draws down the arm $j$ of the eccentric, $h$, and the load is discharged from the teeth, the latter being perfectly free to turn down as soon as the connections $g^\times$, at the upper ends of the rods $f\,f$, pass outward beyond a vertical line which passes through the axis of the eccentric. When the teeth $e\,e$ are raised, they are made to sustain their load in consequence of the connections $g^\times$ being at the inner side of said vertical line, a complete lock being formed thereby.

Having thus described my invention, what I claim as new, and desire to secure by Letters Patent, is—

The frame, composed of the diverging prongs $a\,a$ and head $b$, in combination with the pivoted or jointed teeth $e\,e$, rods $f\,f$, and eccentric $h$, all arranged for joint operation, substantially in the manner as and for the purpose set forth.

The above specification of my invention signed by me, this seventeenth day of December, 1867.

C. E. MURRAY.

Witnesses:
J. M. QUIGGLE,
JNO. W. FLEMING.